Feb. 26, 1946.  R. D. POWELL  2,395,429

PISTON RING GAP FILLER

Filed Sept. 21, 1943

Robert D. Powell,
INVENTOR.

BY
Victor J. Evans & Co.
ATTORNEYS

Patented Feb. 26, 1946

2,395,429

UNITED STATES PATENT OFFICE 2,395,429

PISTON RING GAP FILLER

Robert D. Powell, Camden, N. J.

Application September 21, 1943, Serial No. 503,258

2 Claims. (Cl. 309—47)

My invention relates to piston rings, and has among its objects and advantages the provision of an improved piston ring expander and gap filler.

Piston rings tend to separate at their ends as they wear with the result that objectionable gaps are formed. Thus provision of a ring expander may bring the ring into proper sealing relationship with respect to the cylinder wall, but such expansion results in an objectionable gap between the ends of the ring.

Accordingly, an object of my invention is to provide novel means for sealing the gap between the ends of worn rings to the end that proper compression may be maintained in the engine.

Figure 1:
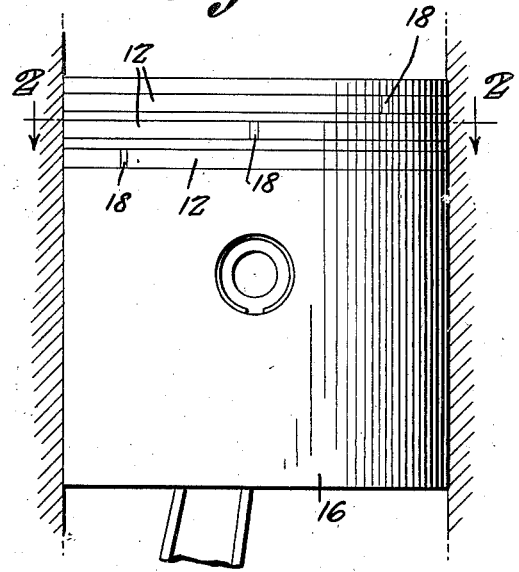
Figure 1 is an elevational view of a conventional piston illustrating the rings thereof spaced at their ends and the resulting gaps closed by fillers.
Figure 2:
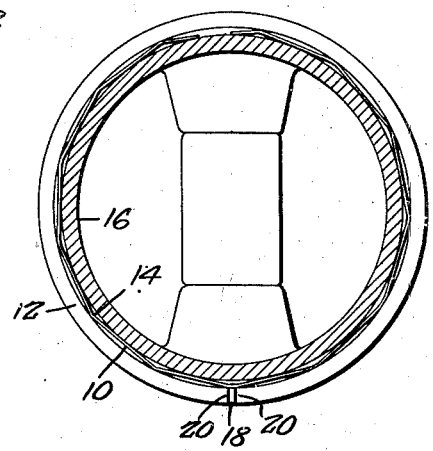
Figure 2 is a sectional view taken along the line 2—2 of Figure 1.
Figure 3:
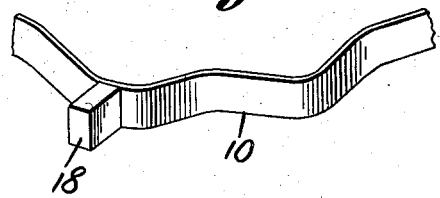
Figure 3 is a perspective view of a portion of an expander ring in association with its gap filler.

In the embodiment selected for illustration, I make use of an expander ring 10 adapted to be fitted underneath the piston ring 12 and in the usual groove 14 in the piston 16. To the expander ring 10 is connected a filler 18 for filling the gap between the piston ring ends 20 so as to provide an unbroken seal throughout the entire circumference of the piston ring. The filler 18 is fixedly connected with the expander ring 10 so that the expander ring constitutes a carrier for the filler. Thus the expander ring 10 performs a twofold function in that it provides a resilient expander for the piston ring in addition to serving as a mount for the filler 18. The expander rings may be made up with fillers of different gap filling proportions so as to provide accurate fits under variable structural conditions.

Figure 4:
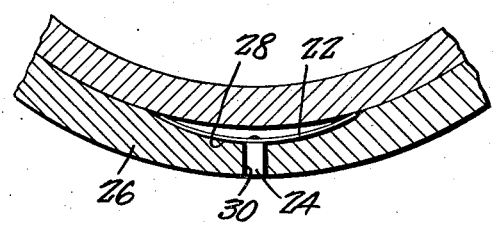
Figure 4 is a fragmentary sectional view of a ring having such close fitting relationship with the piston as to prevent the incorporation of an expander ring between the piston ring and the piston, but illustrating a modified form of gap filler for such conditions.
Figure 5:
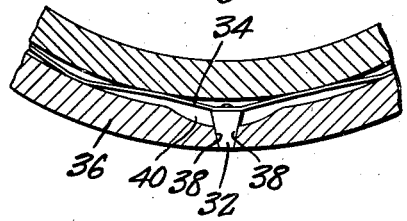
Figure 5 is a perspective view of the gap filler of Figure 4.

In many cases the piston ring has such close fitting relationship with the bottom face of its groove as to make it impossible to insert an expander ring underneath the piston ring. Under such conditions, the gap filler of Figures 4 and 5 constitutes a short length of resilient strap material 22 having a gap filler 24 secured thereto intermediate its ends and on the convex side thereof. To provide accommodation for the short strap 22, the piston ring 26 is ground away at 28 to provide room for the strap 22. The space is located adjacent the ends of the piston ring so that the gap filler 24 will register with the gap 30 between the spaced ends of the piston ring.

Figure 6:
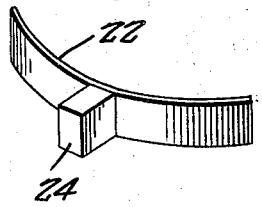
Figure 6 is a fragmentary view of an expander ring illustrating a modified form of gap filler.

Figure 6 illustrates a form wherein a tapered filler 32 is attached to the expander ring 34. The piston ring 36 is ground to provide end faces 38 tapered in conformity with the contour of the filler 32. I prefer to mount the filler 32 on an apex of the expander ring 34 so as to bring the base of the filler 32 in close relationship with the inner face of the piston ring 36, the latter being ground away at 40 to provide room for expansion of the ring 34 to hold the filler 32 in pressure engagement with the ends 38. The filler 32 is formed of relatively soft material so as to wear down through engagement with the cylinder wall as the filler is advanced outwardly in the gap to compensate for wear of the piston ring 36. To further assure its outward advancement as the piston ring 36 wears, the filler 32 is greater in length than the thickness of the ends of the piston ring, as clearly shown in Figure 6.

Without further elaboration, the foregoing will so fully illustrate my invention, that others may, by applying current knowledge, readily adapt the same for use under various conditions of service.

I claim:

1. In a piston having a groove and a piston ring in the groove, the piston ring having spaced ends converging radially outward of the piston and having the inner faces of its ends cut away to provide a semicircular recess, an expander ring located in the groove between the bottom wall thereof and the piston ring, the expander ring having a bowed formation located in and conforming to said recess, and a filler body carried by the bowed formation of the expander ring and located between the ends of the piston ring, the filler body being of wedge formation and contacting with the ends of the piston ring.

2. The invention described in claim 1, wherein the filler body is greater in length than the thickness of the ends of the piston ring.

ROBERT D. POWELL.